(12) United States Patent
Ivanov et al.

(10) Patent No.: US 11,510,026 B2
(45) Date of Patent: Nov. 22, 2022

(54) RADIO-VISUAL APPROACH FOR DEVICE LOCALIZATION BASED ON A VEHICLE LOCATION

(71) Applicant: HERE GLOBAL B.V., Eindhoven (NL)

(72) Inventors: Pavel Ivanov, Tampere (FI); Michael Krasniansky, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 159 days.

(21) Appl. No.: 17/128,139

(22) Filed: Dec. 20, 2020

(65) Prior Publication Data

US 2022/0007131 A1    Jan. 6, 2022

Related U.S. Application Data

(60) Provisional application No. 63/046,783, filed on Jul. 1, 2020.

(51) Int. Cl.
*H04W 4/02* (2018.01)
*H04W 4/029* (2018.01)
(Continued)

(52) U.S. Cl.
CPC ........... *H04W 4/023* (2013.01); *G01S 1/045* (2013.01); *G01S 1/047* (2013.01); *G06T 7/70* (2017.01);
(Continued)

(58) Field of Classification Search
CPC ........ H04W 4/023; H04W 4/029; G06T 7/70; G06T 2207/30248; G01S 1/045; G01S 1/047
See application file for complete search history.

(56) References Cited

U.S. PATENT DOCUMENTS 8,369,872 B2 * 2/2013 Gessner ............... G01S 5/0263
455/456.2
10,268,216 B2 4/2019 Alt
(Continued)

FOREIGN PATENT DOCUMENTS

CN          104871147 A  *  8/2015  ........ H04M 1/72577
DE     102017218237 A1     4/2019
(Continued)

OTHER PUBLICATIONS

Tang, et al., "Improving Performance of Pedestrian Positioning by Using Vehicular Communication Signals," Graduate School of Informatics and Engineering, The University of Electro-Communications, IET Intell. Transp. Syst., 2018, vol. 12, Iss. 5, pp. 366-374.
(Continued)

*Primary Examiner* — Dung Hong
(74) *Attorney, Agent, or Firm* — Peter H. Yu; HERE Technologies

(57) ABSTRACT

Disclosed is a radio-visual approach for device localization. In particular, a mobile device may receive, via radio signal(s) emitted by transmitter(s) in a vehicle that is substantially proximate to the mobile device, radio data that represents vehicle information associated with the vehicle, and may then determine or obtain a location of the vehicle in accordance with that vehicle information. Also, the mobile device may capture an image of the vehicle and may use that image as basis for determining a relative location indicating where the mobile device is located relative to the vehicle. Based on the location of the vehicle and on the relative location of the mobile device, the mobile device may then determine a location of the mobile device.

20 Claims, 7 Drawing Sheets

(51) Int. Cl.
*G01S 1/04* (2006.01)
*G06T 7/70* (2017.01)
(52) U.S. Cl.
CPC ... H04W 4/029 (2018.02); *G06T 2207/30248* (2013.01)

(56) References Cited

U.S. PATENT DOCUMENTS

| | | | |
|---|---|---|---|
| 2015/0350846 A1* | 12/2015 | Chen | G01S 5/16 455/456.1 |
| 2016/0253619 A1* | 9/2016 | Miles | H04W 4/029 701/517 |
| 2016/0371840 A1* | 12/2016 | Zhou | H04W 4/029 |
| 2018/0342157 A1 | 11/2018 | Donnelly | |
| 2018/0357907 A1* | 12/2018 | Reiley | H04W 4/023 |
| 2019/0228539 A1 | 7/2019 | Alt et al. | |
| 2019/0279049 A1* | 9/2019 | Doria | G06V 20/56 |
| 2019/0332123 A1 | 10/2019 | Donnelly | |
| 2020/0218905 A1* | 7/2020 | Wang | G01C 21/30 |
| 2020/0264262 A1* | 8/2020 | Taniguchi | G01S 5/0257 |

FOREIGN PATENT DOCUMENTS

| | | | |
|---|---|---|---|
| EP | 1229343 A1 | | 8/2002 |
| KR | 100533033 B1 | | 12/2005 |
| KR | 101868125 B1 | * | 8/2016 |
| KR | 20180055158 A | | 5/2018 |

OTHER PUBLICATIONS

U.S. Appl. No. 17/128,139, filed Dec. 20, 2020 (60 pps).
U.S. Appl. No. 17/128,145, filed Dec. 20, 2020 (60 pps).

* cited by examiner

RADIO-VISUAL APPROACH FOR DEVICE LOCALIZATION BASED ON A VEHICLE LOCATION

CROSS REFERENCE TO RELATED APPLICATION

This application claims priority from U.S. Provisional Application Ser. No. 63/046,783, entitled "Radio-Visual Approach for Device Localization based on a Vehicle Location," filed on Jul. 1, 2020, the contents of which are hereby incorporated herein in their entirety by this reference.

FIELD OF THE DISCLOSURE

Embodiments of the present disclosure relate to the field of location technologies, and more specifically to methods and systems for improved device localization.

BACKGROUND

High accuracy and real-time localization of devices could provide for numerous benefits, such as by enabling reliable tracking of assets and/or navigation through indoor and outdoor environments, among other possibilities. Such benefits may be realized through the development of location-based system(s) and associated service(s) that may collectively provide solution(s) to various location-related challenge(s) and use case(s).

Pedestrian navigation, especially in urban environments, relies upon receiving precise real-time location data. In practice, navigation is often accomplished using Global Navigation Satellite System (GNSS) technology, such as a global positioning system (GPS) that may provide a real-time location with a 95% confidence interval of 7.8 meters, for instance. However, in certain urban environments, reflection or obstruction of GPS signals by tall buildings and other structures can further increase this error, such that a determined location may be off by as much as 30 meters (known as multipath error). Thus, GNSS-based localization may not always be reliable.

One approach for improving localization may involve use of local device sensors, such as inertial measurement units (IMUs). Such sensors can increase accuracy of localization by taking into account device movement and may also have the additional benefit of providing information about device orientation. Unfortunately, however, these sensors may drift and thus still not help obtain sufficiently accurate location and/or orientation data for a sufficient duration of time. Moreover, sensor fusion algorithms that tend to rely on such sensors typically also rely on GNSS for accurate initial location and/or heading, but GNSS may not always be reliable as noted.

Yet another approach for improving localization involves visual-based localization. Specifically, visual-based localization methods have been contemplated as an alternative and/or a supplement to GNSS navigation in some environments due to the ability of visual-based localization methods to achieve high accuracy of localization. Current visual localization methods rely on a database of geo-tagged visual features, thereby requiring a visual survey of area(s) of interest before localization can be done. As such, an obvious barrier to ubiquitous implementation of visual-based localization methods is scalability, especially on a global scale, as an incredibly large database would be required to store data on a large number of geo-tagged visual features. Thus, existing visual-based localization methods also may not always be scalable and/or reliable.

Given the various deficiencies of existing device localization techniques, it becomes apparent that there is a widely recognized need for alternative and/or additional localization solution(s) and technologies.

SUMMARY

Disclosed herein are improved approaches for localization of a device, such as of a mobile device that may be used to assist with pedestrian navigation, or the like. The disclosed approaches may leverage known location(s) of vehicle(s) in the vicinity of the mobile device, which often may be relatively accurate and reliable location(s).

In particular, vehicles that move around an environment can be localized frequently and precisely for numerous reasons. For example, a vehicle may at least sometimes traverse "open-sky" area(s) where GNSS-based localization does not suffer from issues such as the multipath effect, but rather tends to be accurate and reliable. And even when the vehicle is not in an open-sky area, the vehicle's on-board computer(s) may still enable accurate localization by executing e.g., sensor fusion algorithms that leverage a reliable and accurate GNSS-based location that has been recently acquired when the vehicle traversed an open-sky area. Furthermore, a vehicle may have strict location-related constrains, as it typically follows roads and/or lanes rather than unconstrained areas. Moreover, a vehicle may have sufficient extent of computational and energy resources to enable frequent determination of the vehicle's location.

Generally speaking, such considerations are particularly applicable to autonomous and semi-autonomous vehicles, which may rely on very precise location information and location-related constraints, and are expected to be widely adopted in the years and decades to come.

Given this, in accordance with the present disclosure, a vehicle locations database can be established to enable improved localization. The database may include information about vehicles' respective locations (and/or orientations) along with corresponding vehicle parameter(s), such as color, shape, dimensions, plate number, make, and/or model, among other options. These locations (and/or orientations) may include substantially real-time locations (and/or orientations) and/or most recently acquired locations (and/or orientations) of vehicles. Moreover, such a database can be established by having vehicles' on-board computer(s) write location information to the database and/or by having positioning server(s) write such location information to the database on behalf of the vehicle(s), among other possibilities. In any case, the database can be accessible to a mobile device, to enable improved localization using the disclosed approaches.

According to the present disclosure, a mobile device could obtain a nearby vehicle's location and/or orientation from the database and may also determine its location and/or orientation relative to the vehicle so as to enable improved localization. In particular, the mobile device could capture an image of the nearby vehicle and apply computer vision techniques to determine its relative location and/or orientation. Based on the vehicle's location and/or orientation and on the mobile device's relative location and/or orientation, the mobile device could then more precisely derive its own absolute location and/or orientation in the environment.

Generally speaking, the present disclosure sets forth multiple approaches that enable improved localization as described. The first approach disclosed herein is a radio-visual approach that uses both radio and image data for device localization according to a vehicle location, and the second approach disclosed herein is a fully visual image-based approach that mostly uses image data for device localization according to a vehicle location.

According to the radio-visual approach, a mobile device may detect and identify a nearby vehicle by deriving information about the vehicle from radio signal(s) emitted by the vehicle's radio transmitters. Such vehicle information may indicate the vehicle's parameters, thereby enabling the mobile device to identify the vehicle in the above-described database and obtain that vehicle's location and/or orientation from the database, especially when the information derived from the radio signal(s) does not include the vehicle's location and/or orientation. And when the vehicle is detected, the mobile device may also obtain an image of the vehicle, such as e.g., following display by the mobile device of a prompt requesting that a user capture an image of the vehicle detected nearby. In turn, the mobile device may use the obtained image as described to determine the mobile device's location and/or orientation relative to the vehicle, and consequently the mobile device's absolute location and/or orientation in the environment.

On the other hand, according to the image-based approach, a mobile device may obtain one or more images of a nearby vehicle, such as e.g., following display by the mobile device of a prompt indicating that current device localization is inaccurate. The mobile device may then use one or more of those image(s) not only for determining the mobile device's relative location and/or orientation, but also to determine information about the vehicle, such as by applying image analysis techniques to determine the vehicle's parameters from the image(s). And once the mobile device determines such information about the vehicle, the mobile device could obtain that vehicle's location and/or orientation from the database as described. In this way, the mobile device can use one or more image(s) of a vehicle to enable determination of the mobile device's absolute location and/or orientation in the environment.

Overall, the disclosed approaches for device localization may provide for numerous benefits. For example, the disclosed approaches may enable accurate and reliable device localization, even in (e.g., urban) environments where GNSS may not be available, accurate, and/or reliable. Furthermore, unlike existing visual localization methods, the disclosed approaches can enable accurate device localization without the need for an incredibly large database of geo-tagged visual features. As such, the disclosed approaches may improve pedestrian and other navigation experiences and may have various other advantages as well.

Accordingly, in one aspect, disclosed is a first method. The first method involves: receiving, by one or more processors of a mobile device via one or more radio signals emitted by one or more transmitters in a vehicle that is substantially proximate to the mobile device, radio data that represents vehicle information associated with the vehicle; determining or obtaining, by the one or more processors, a location of the vehicle in accordance with the vehicle information represented by the radio data; receiving, by the one or more processors from an image capture device of the mobile device, an image of the vehicle that is substantially proximate to the mobile device; based at least on the image of the vehicle, determining, by the one or more processors, a relative location indicating where the mobile device is located relative to the vehicle; and based on the location of the vehicle and on the relative location of the mobile device, determining, by the one or more processors, a location of the mobile device.

In another aspect, disclosed is a second method. The second method involves: receiving, by one or more processors from an image capture device of a mobile device, one or more images of a vehicle that is substantially proximate to the mobile device; based on one or more of the images, the one or more processors: (i) determining one or more parameters associated with the vehicle, and (ii) determining or obtaining a location of the vehicle in accordance with the one or more determined parameters; based on one or more of the images, the one or more processors determining a relative location indicating where the mobile device is located relative to the vehicle; and based on the location of the vehicle and on the relative location of the mobile device, determining, by the one or more processors, a location of the mobile device.

In yet another aspect, disclosed is an apparatus including one or more processors, a non-transitory computer readable medium, and program instructions stored on the non-transitory computer readable medium. The program instructions may be executable by the one or more processors to perform any operations described herein, such as any of those set forth in the first and/or second methods, among others.

In yet another aspect, disclosed is a non-transitory computer readable medium having stored thereon instructions executable by one or more processors to cause a mobile device to perform any operations described herein, such as any of those set forth in the first and/or second methods, among others.

These as well as other features and advantages of the invention will become apparent from the following detailed description considered in conjunction with the accompanying drawings where appropriate. It should be understood, however, that the drawings are designed solely for purposes of illustration and not as a definition of the limits of the present disclosure. It should be further understood that the drawings are not drawn to scale and that they are merely intended to conceptually illustrate one or more of the features described herein.

DETAILED DESCRIPTION

Some embodiments of the present disclosure will now be described in more detail with reference to the accompanying drawings, in which some, but not all, embodiments of the present disclosure are shown. Indeed, various aspects of the present disclosure may be embodied in different forms and should not be construed as limited to the embodiments set forth herein.

I. Example Systems

Figure 1:
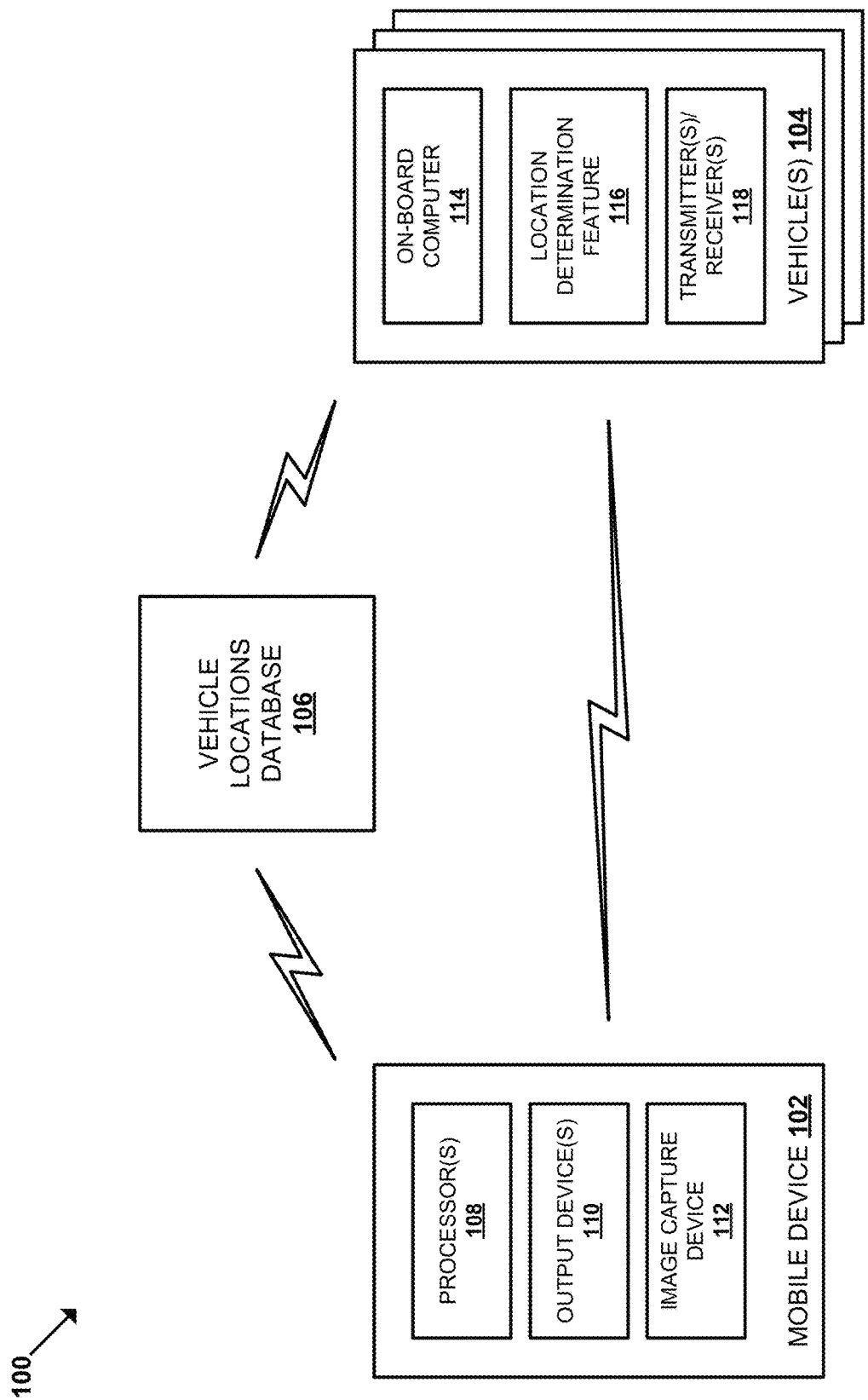
FIG. 1 illustrates an arrangement that may enable device localization, in accordance with an example implementation.

FIG. 1 illustrates an arrangement 100 that may enable device localization, in accordance with an example implementation. Arrangement 100 could include a mobile device 102, one or more vehicles 104, and a vehicle locations database 106. The mobile device 102, vehicle(s) 104, and/or database 106 may be configured to communicate with one another via one or more communication links, such via radio communication links and/or via a cellular and/or a non-cellular communication network, among other options.

As an initial matter, a mobile device could be any electronic device that is movable from one position to another. For example, mobile device 102 could be or otherwise include cellular phone(s), personal digital assistant(s), a laptop computer(s), tablet computer(s), and/or wearable device(s), among other options. In practice, such a mobile device 102 may include processor(s) 108, output device(s) 110, and an image capture device 112, among other components further contemplated herein. Processor(s) 108 may be configured to e.g., execute program code to cause mobile device 102 to perform and/or control operations, such as any of those described herein and/or other operations. Also, output device(s) 110 may include e.g., display device(s), audio device(s) or the like for visually and/or audibly providing information (e.g., to a user). Furthermore, an image capture device 112 may include any device that enables capture of image(s) of surroundings of the mobile device, such as any feasible type of camera for capturing photos, videos, or the like. Other examples are also possible.

Yet further, vehicle(s) 104 may include any means for carrying and/or transporting people and/or goods. For example, a vehicle could be or otherwise include a car, a bus, a truck, a motorcycle, a van, a bicycle, a scooter, or a cart, among numerous other possibilities. Although embodiments of the present disclosure may be mostly described in the context of a car, it should be understood that such embodiments may extend to apply to any feasible type of vehicle without departing from the scope of the present disclosure.

In practice, a given vehicle 104 may include an on-board computer 114, a location determination feature 116, and/or transmitter(s)/receiver(s) 118. Of course, a given vehicle 104 may additionally or alternatively include other components as understood by one of ordinary skill in the art without departing from the scope of the present disclosure.

Generally speaking, the on-board computer 114 may be configured to perform numerous operations including, but not limited to, controlling vehicle operations (e.g., in an autonomous or assisted driving mode), engaging in communication with other vehicle components (e.g., vehicle sensor(s)), and/or engaging in communication with external entities (e.g., mobile device 102 and/or database 106), perhaps using transmitter(s)/receiver(s) 118.

Additionally, location determination feature 116 could be any mechanism that enables determination of the vehicle's location. For instance, feature 116 may leverage any feasible combination of the following technologies to enable determination of the vehicle's location: GNSS-based positioning, sensor-based positioning, radio-based (e.g., Wi-Fi and/or Bluetooth®) positioning, image-based positioning, and/or visual localization, among other options.

Further, transmitter(s)/receiver(s) 118 may be any device(s) that enable a vehicle to transmit and/or receive information to/from other entities, such as mobile device 102 and/or database 106. For example, transmitter(s)/receiver(s) 118 may include radio transmitter(s) and/or receiver that can emit and/or receive radio signals according to one or more communication standards or protocols, such as Bluetooth®, Wi-Fi (e.g., IEEE 802.11), Near Field communications (NFC), and/or Cellular (e.g. Global System for Mobile Communications (GSM), Universal Mobile Telecommunications System (UMTS), Long Term Evolution (LTE), and/or 5G), among others.

Finally, in accordance with the present disclosure, the vehicle locations database 106 can be established to enable improved localization as noted above. The database 106 could be a standalone database, or could be incorporated within or otherwise associated with a server (not shown). Such a server may be configured to engage in communications with various entities (e.g., mobile device 102 and/or vehicle(s) 104), and/or to add, remove, and/or update information in the database 106. In some implementations, the database 106 or portion thereof could be stored on the mobile device 106. For instance, the mobile device 102 could continuously or from time-to-time download, request, and/or otherwise obtain information from the database 106 that is associated with the mobile device's current location, such as location information related to the vehicle(s) in the vicinity (e.g., within a threshold distance of) the mobile device 102, or the like. Other implementations are also possible.

In line with the discussion above, the database 106 may include information about vehicles' respective locations (and/or orientations) along with corresponding vehicle parameter(s), such as color, shape, dimensions, plate number, make, model, and/or vehicle identifier etc. In particular, the information in the database 106 may associate each respective vehicle location (and/or orientation) with one or more respective parameters of a respective vehicle from among a plurality of vehicles. Such a database 106 may represent information for vehicles globally, locally, and/or for specific areas, among other options. And the locations (and/or orientations) at issue may include substantially real-time locations (and/or orientations) and/or most recently acquired locations (and/or orientations) of vehicles.

In practice, the locations and/or orientations in the database 106 could be represented in various ways without departing from the scope of the present disclosure. For example, a given location in the database 106 could be represented in the form of global and/or local geographic coordinates. Additionally or alternatively, a given location in the database 106 could be represented by an identifier of a point of interest, a particular street address, a name of an intersection, or the like, any one of which could be converted to geographic coordinates using e.g., geocoding tools/techniques, among others. Moreover, in this regard, a given orientation in the database 106 could be represented as a two-dimensional or three-dimensional orientation vector, among other possibilities. Other examples are also possible Furthermore, database 106 can be established in various ways. For example, on-board computer(s) 114 of vehicle(s) 104 could write location information to the database 106 and/or positioning server(s) could determine and write such location information to the database 106 on behalf of the vehicle(s), among other possibilities. In another example, on-board computer(s) 114 of vehicle(s) 104 could respectively write, to the database 106, information about the respective vehicle(s), such as about the above-mentioned parameters.

In some implementations, however, an on-board computer 114 may provide more limited information about the vehicle, and a server associated with database 106 may use that limited information to obtain additional information about the vehicle, so as to then update the database 106 to include any feasible combination of the information. For instance, a vehicle information number (VIN) may be used to uniquely identify a vehicle, and different portion(s) of the VIN may be respectively used to derive information about different vehicle parameter(s). As an example, the first character of a VIN may represent a country of manufacture, the second character of a VIN may represent a vehicle manufacturer, and the fourth through eighth characters can be used together to derive a vehicle's brand, body style, engine size, type, model, series etc. Thus, on-board computer 114 could provide just a VIN of the vehicle, and the server at issue may in turn determine vehicle parameters based on the VIN, such as by querying a VIN database accessible via the web. Other examples are also possible.

Regardless of how the database 106 is established, there may be numerous approaches for enabling the gathering of such information from vehicles. By way of example (and without limitation), a particular entity responsible for the database, such as a company developing location-related technologies, may provide various incentives in exchange for permission to crowdsource data from vehicles. As a non-limiting example, owners of vehicle may receive location-related services, products, and/or data at a reduced price or for free in exchange for permission to crowdsource data. Other examples are also possible.

Accordingly, in a system arranged as described, the database 106 can be accessible to mobile device 102, to enable improved device localization as described herein.

II. Illustrative Methods

As noted above, the present disclosure is directed to improved approaches for device localization, including a radio-visual approach and a fully visual image-based approach.

A. Radio-Visual Approach for Device Localization

According to the radio-visual approach, a mobile device (e.g., mobile device 102) may receive radio data from a nearby vehicle by way of radio signal(s) emitted by that vehicle, and this radio data may represent vehicle information associated with the vehicle. In some cases, the vehicle information may include or otherwise represent a location and/or orientation of the vehicle. In practice, inclusion of such information might depend on the communication protocols used by the vehicle, as some protocol(s) may involve communication of such location information and other protocol(s) may not involve communication of such location information. In any case, the vehicle information may additionally or alternatively include or otherwise represent parameter(s) associated with the vehicle, such as any of those described herein, among others.

Once the mobile device receives the radio data from the nearby vehicle, the mobile device could then determine or obtain a location and/or orientation of the vehicle in accordance with the vehicle information presented by the radio data. As an initial matter, if the vehicle information already includes the location and/or orientation of the vehicle, then the mobile device could derive the location and/or orientation of the vehicle directly from the receive radio data. However, in many situations, such as when the communication protocol(s) do not include communication of the location and/or orientation of the vehicle, the mobile device may use an alternative technique to obtain the location and/or orientation in accordance with the present disclosure. In this alternative technique, the mobile device could make a determination that the vehicle information lacks the location and/or orientation of the vehicle, and could responsively determine or obtain the location and/or orientation in accordance with location information in the vehicle locations database 106 and the vehicle information.

More specifically, the mobile device could search and/or query the database 106, to obtain the location and/or orientation of the vehicle from the database 106 in accordance with the vehicle's parameter(s) derived from the radio data. In an example implementation of this process, the mobile device could transmit a request to a server associated with the database 106, the request including the parameter(s) of the vehicle. The server may in turn search the database 106 using the parameter(s) to determine the vehicle's respective location and/or orientation, which may correspond to or otherwise be associated with the vehicle's parameter(s) in the database 106 as described. As such, the server may then transmit the determined location and/or orientation of the vehicle to the mobile device, thereby effectively enabling the mobile device to obtain the location and/or orientation of the vehicle even when such information is not included in the radio data received directly from the vehicle. Other implementations are also possible.

Although database 106 may be small relative to e.g., a database of geo-tagged visual features typically relied upon in many visual localization methods, the database 106 might still include a lot of information and thus it may be beneficial to deploy techniques for a filtered search of information in the database 106, so as to help an entity (e.g., server or mobile device) save time and/or computational resources etc. For instance, the entity could filter the information in the database according to certain criteria. By way of example (and without limitation), the mobile device could determine its approximate/coarse location (e.g., using GPS) and could transmit this approximate location to the above-mentioned server. In turn, the server may perform a filtered search of the database 106 by e.g., only evaluating information for a set of vehicles that are within a threshold distance (e.g., 100 meters) away from the device's approximate location, particularly based on the vehicle locations set forth in the database 106. And the server may then identify the vehicle (and its corresponding location and/or orientation) from among the set of vehicles according to the vehicle's parameter(s) as described above. Other examples are also possible.

In addition to determining or obtaining the vehicle location and/or orientation, the mobile device may determine its relative location and/or orientation, which may respectively indicate where the mobile device is located relative to the vehicle and/or how the mobile device is oriented relative to the vehicle. In doing so, the mobile device may receive an image of the vehicle from its image capture device and may use that image as basis to determine the relative location and/or orientation of the mobile device. The mobile device could do so in various ways.

By way of example (and without limitation), the mobile device could apply a computer vision process to determine the relative location and/or orientation ("pose") of the mobile device based on the image of the vehicle. In practice, computer vision may include techniques for processing, analyzing, and/or understanding digital images, so as to extract or otherwise determine e.g., symbolic or numerical information about the real world.

In a more specific example, application of a computer vision process could enable pose estimation so as to estimate a location and/or orientation of a specific object (e.g., vehicle) in an image relative to a camera (e.g., image capture device of the mobile device), which in turn can enable determination of the camera's relative pose, or more specifically the relative location and/or orientation of the mobile device that includes that camera. Example software that enables such pose estimation may include (but is not limited to): (i) "posest"—a C/C++ library for pose estimation from point correspondences that is distributed as open source under the General Public License; (ii) "diffgeom2pose"—a MATLAB solver for pose estimation; and/or (iii) "MINUS"—a C++ package for relative pose estimation. Accordingly, the mobile device may apply such a computer vision process on an image of the vehicle, and the resulting output may be a digital representation(s) of the mobile device's relative location and/or orientation. Numerous other examples are also possible without departing from the scope of the present disclosure.

In some implementations, the mobile device could output a prompt requesting capture of an image of the vehicle, to enable determination of the relative location and/or orientation as described. For instance, the mobile device could respond to receipt of the above-mentioned radio data by causing its output device(s) (e.g., output device(s) 110) to provide a notification requesting capture of an image of the vehicle that is substantially proximate to the mobile device. This notification could be a textual notification, an image-based notification, an audible notification, and/or a vibrating alert, among other options.

In a more specific example, the mobile device may responsively cause (i) a display device to output a version of the notification via a graphical user interface (GUI) (e.g., of a navigation application) displayed by the display device and/or (ii) an audio device a version of the notification that may be audible to a user. Such notification(s) may include (i) a representation of a field of view of the image capture device of the mobile device, (ii) textual and/or audible information about the vehicle, and/or (iii) a textual and/or audible description(s) requesting capture of the image of the nearby vehicle, among other options. In practice, information about the vehicle may include e.g., any information related to the vehicle's parameters (e.g., make, color, and/or plate number), to allow a user to recognize and capture an image of the correct vehicle, especially when there may be multiple vehicles in the user's vicinity. Other examples are also possible.

In this regard, additional features can be implemented as measures to ensure successful and timely capture of a vehicle's image, in accordance with the disclosed approaches, to enable various use cases contemplated herein.

For example, a user could be guided to ensure success of the process at issue. For instance, once an image of the vehicle has been captured and the vehicle's relative location and/or orientation have been successfully determined, the mobile device could responsively (an optionally) output an additional notification indicating such success of the aforementioned process. Additionally or alternatively, if an image was not captured, if the image is not of the correct vehicle, and/or if the relative location and/or orientation could not be determined successfully (e.g., due to poor image quality), then the mobile device could responsively output an additional notification indicating any one of these issues and/or requesting capture of an additional image, among other possibilities.

In another example, consider a situation where navigation is provided from an outdoor location to a specific indoor location. In this situation, the mobile device may detect a nearby vehicle as discussed and may also determine that the mobile device is in the vicinity of the entrance to the building (e.g., based on an approximate/coarse location of the mobile device being within a threshold distance of the entrance). And responsive to such triggers, the mobile device could output the above-mentioned notification requesting capture of an image of the vehicle. In this way, the disclosed approaches can help ensure that an accurate outdoor mobile device location is determined in anticipation of an outdoor-to-indoor transition, to then enable accurate indoor navigation to the specific indoor location, as further contemplated herein.

In another example, there may be a situation where a user is about to point the camera at an identified vehicle as a result of the prompt, but the vehicle may no longer be in the vicinity (e.g., due to fast driving). To help overcome this issue, the mobile device could be configured to detect nearby vehicles as described in a more continuous manner, and to provide new "fresh" notifications respectively requesting capture of image(s) of those vehicle(s). In practice, when the mobile device provides and initial or new notification, it may be for the "closest" vehicle, such according to signal strength of radio signal(s) from that vehicle being stronger compared to signal(s) from other vehicle(s), among other options. Other examples are also possible.

Once the mobile device determines the location and/or orientation of the vehicle as well as the relative location and/or orientation of the mobile device, the mobile device could then use this information to determine the absolute location and/or orientation of the mobile device.

For example, the mobile device could apply a coordinate conversion process to determine its absolute location in a global coordinate system. For instance, the above-mentioned relative location may be represented as local coordinates with respect to the vehicle, and the vehicle location may be represented as global coordinates. Given this, the mobile device could convert the local coordinate at issue to global coordinates based on the vehicle's global coordinates, so as to determine the global coordinates of the mobile device. In practice, the mobile device could do so in accordance with any currently-known and/or future-developed coordinate conversion techniques, such as the "local2globalcoord" function in MATLAB and/or the "py_loc_to_glob" function in Python, among other possibilities.

Similarly, the mobile device could apply an orientation transformation process to determine its absolute orientation in a global coordinate system. For instance, the above-mentioned relative orientation may be represented as a "first vector" relative to a local coordinate system with respect to the vehicle, and the vehicle's location and/or orientation may be respectively represented as coordinates and a "second vector" relative to a global coordinate system. Given this, the mobile device could transform representation of the first vector to be relative to the global coordinate system, specifically doing so based on the vehicle's global coordinates and/or the second vector associated with the vehicle. In practice, the mobile device could do so in accordance with any currently-known and/or future-developed techniques, such as the functions mentioned above. Other examples are also possible.

Furthermore, the mobile device could use the techniques described herein to derive a bearing/heading of the mobile device relative to a global coordinate system. For example, the orientation of the mobile device may be represented as a vector having a direction that corresponds to particular portion(s) of the mobile device. For instance, the direction may correspond to a top portion of the smartphone device when the device is held in a portrait mode, the top portion being opposite to a bottom portion where a charging port of the smartphone device is typically found. In a more specific example, the vector at issue may connect a dot corresponding to the bottom portion with a dot corresponding to the top portion and may have a direction oriented towards or otherwise in line with the top portion. Accordingly, the mobile device could determine the bearing/heading of the mobile device based on the direction of the vector at issue. Numerous other examples are also possible without departing from the scope of the present disclosure.

Figure 2:
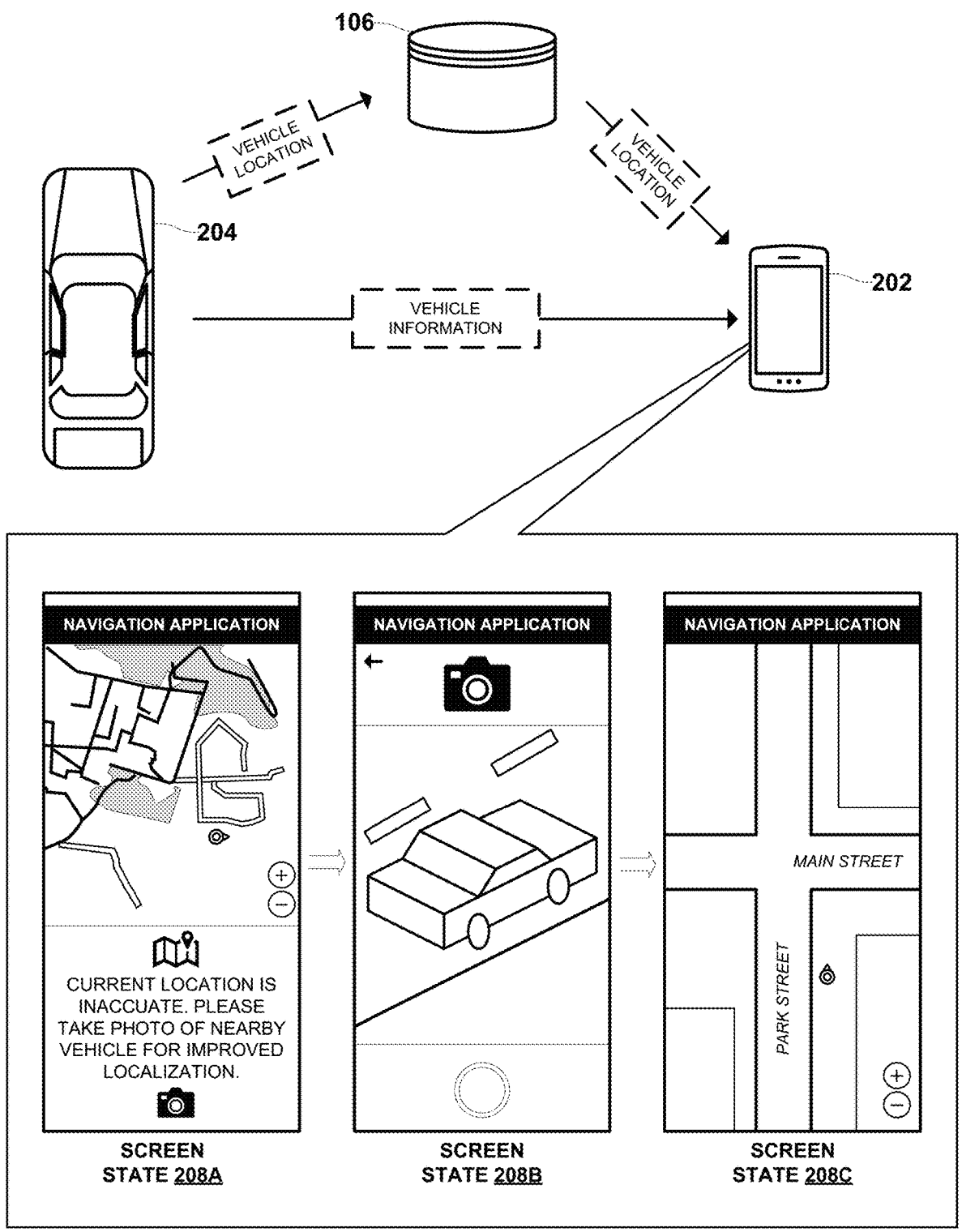
FIG. 2 illustrates an example scenario associated with a radio-visual approach for device localization based on a vehicle location, in accordance with an example implementation.

FIG. 2 next illustrates an example scenario associated with the radio-visual approach for device localization. As shown, a vehicle 204 may write its current location to the database 106, so as to make this vehicle location information available e.g., to the mobile device 202. Given this, the mobile device 202 may obtain vehicle information from the vehicle 204 and may in turn use it to obtain the vehicle 204's current location from the database 106 in accordance with the above-described approach. Further, the mobile device 202 may display a notification in a GUI of a navigation application, the notification requesting capture of an image of the vehicle 204 in line with screen state 208A. As a result, in line with screen state 208B, a user of the mobile device 202 may then capture an image of vehicle 204 (e.g., after transitioning the GUI to a "camera mode" by pressing the camera icon at screen state 208A). And after capture of this image, the mobile device 202 may perform the operations described herein to determine its location and/or orientation, so as to then display this location and/or orientation of the mobile device via the GUI as shown in screen state 208C. In this way, a more accurate device location and/or orientation can be determined, which may have benefits to the end-user and/or other entities as further contemplated herein. Other examples are also possible.

B. Image-Based Approach for Device Localization

As noted above, also disclosed herein is an image-based approach for improved device localization. In accordance with the image-based approach, a mobile device (e.g., mobile device 102) may use image data as basis for determining both the vehicle's location and/or orientation as well as the mobile device's relative location and/or relative orientations, specifically doing so without having to rely on any radio data as described in the context of the radio-visual approach.

In particular, the mobile device could receive image(s) of a vehicle that is substantially proximate to the device, such as when a user captures these image(s) using the device's image capture device. In practice, the image-based approach could be facilitated using just a single such image or multiple such images. In a situation where multiple images of the vehicle are received, the mobile device could use (i) one or more image(s) respectively for determining the vehicle's location and/or orientation and (ii) one or more different image(s) respectively for determining the mobile device's relative location and/or orientation. Additionally or alternatively, the mobile device could use the same image(s) for both determining the vehicle's location and/or orientation as well as the mobile device's relative location and/or orientation. In yet other implementations or scenarios, the mobile device may use a single image for both determining the vehicle's location and/or orientation as well as the mobile device's relative location and/or orientation. Other implementations are also possible.

More specifically, the mobile device could use the image(s) of the vehicle to determine the vehicle's parameter(s). For example, the mobile device could apply any currently-known and/or future-developed image analysis techniques to determine the vehicle's parameter(s), which may include the vehicle's color, shape, dimensions, plate number, make, and/or model, among other options. Example image analysis techniques may include (but are not limited to): object recognition, image segmentation, feature extraction, color identification, motion detection, video tracking, optical flow, and/or optical character recognition (OCR), among numerous other possibilities. In a more specific example, the mobile device could apply "automatic number plate recognition", which uses OCR and other algorithm(s) on image(s) to determine the vehicle's plate number. In this regard, the mobile device could apply anonymization and/or other data security algorithms with respect to any vehicle parameter(s) deemed to include sensitive information.

Once the mobile device determines the vehicle(s) parameter(s) based on the image(s) of the vehicle, the mobile device could then search and/or query the database 106, to obtain the location and/or orientation of the vehicle from the database 106 in accordance with the vehicle's parameter(s) derived from the image data. Although the parameter(s) are derived from the image data, the mobile device 106 could use the same or similar technique(s) described above (i.e., in the context of the radio-visual approach) for obtaining the vehicle's location and/or orientation from the database 106 in accordance with the vehicle's parameter(s). For instance, the mobile device could transmit a request to a server associated with the database 106, the request including the parameter(s) of the vehicle. And the server may in turn respond by transmitting the location and/or orientation of the vehicle to the mobile device.

Moreover, here again, it may be beneficial to deploy techniques for a filtered search of information in the database 106 in the context of the image-based approach. For instance, in line with the examples above, such a filtered search may be based on the approximate/coarse location of the mobile device. Other examples are also possible.

In addition to using image(s) of the vehicle for determining the vehicle's location and/or orientation, the mobile device may also use image(s) of the vehicle for determining its relative location and/or orientation with respect to the vehicle. For instance, in line with the examples described above, the mobile device could apply a computer vision process to determine the relative location and/or orientation ("pose") of the mobile device based on image(s) of the vehicle. Other examples are also possible.

Once the mobile device determines the location and/or orientation of the vehicle as well as the relative location and/or orientation of the mobile device, the mobile device could then use this information to determine the absolute location and/or orientation of the mobile device. Here again, the mobile device could do so as described above in the context of the radio-visual approach.

Figure 3:
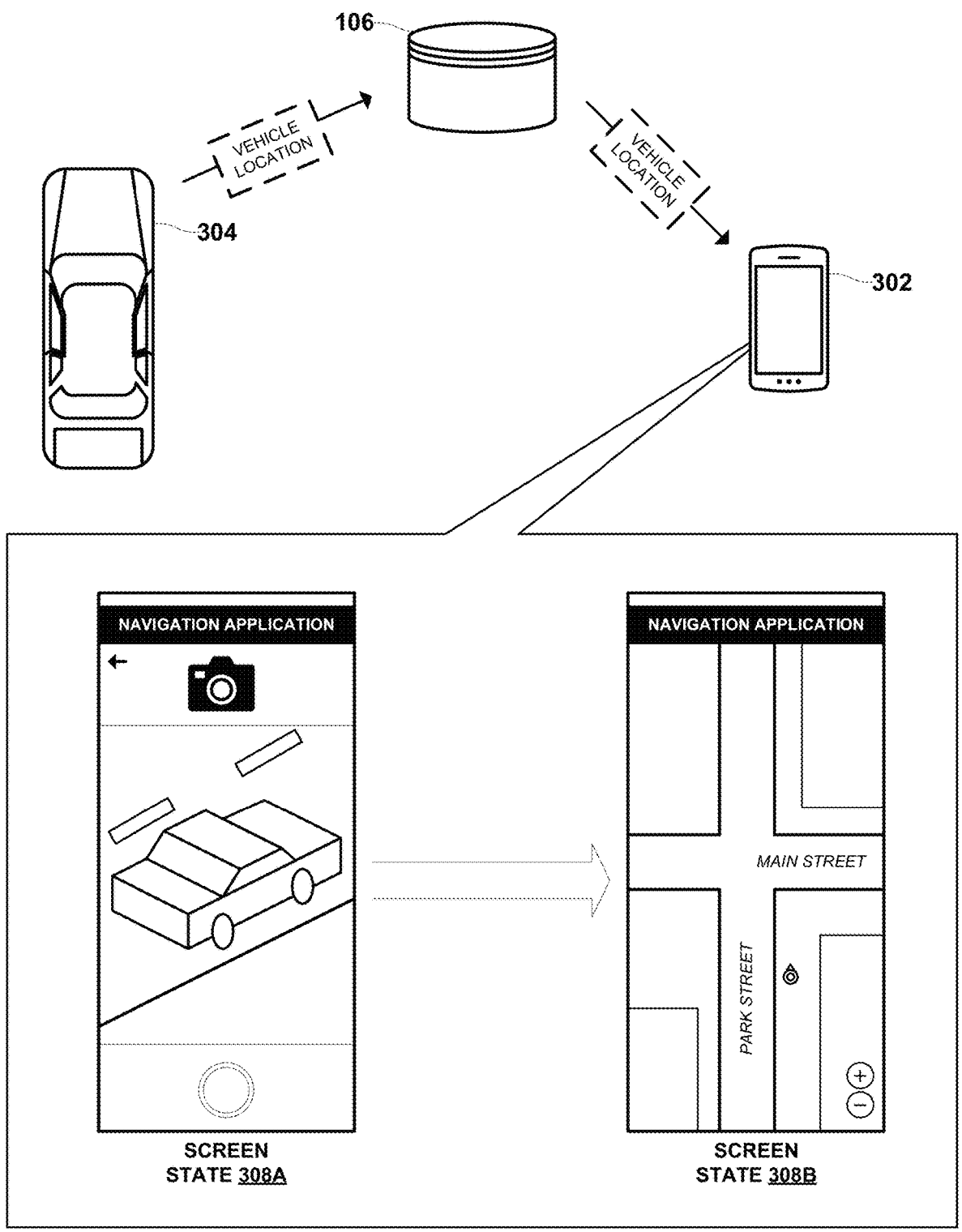
FIG. 3 illustrates an example scenario associated with an image-based approach for device localization based on a vehicle location, in accordance with an example implementation.

FIG. 3 next illustrates an example scenario associated with the image-based approach for device localization. As shown, a vehicle 304 may write its current location to the database 106, so as to make this vehicle location information available e.g., to the mobile device 302. Given this, the mobile device 302 may capture an image of vehicle 304 in line with screen state 308A, and then use the image as described to (i) obtain the vehicle 204's current location and/or orientation from the database 106 and (ii) determine the device's relative location and/or orientation. Given this information, the mobile device can then determine and display its location and/or orientation via the GUI as shown in screen state 308B. In this manner, a more accurate device location and/or orientation can be determined, which may have benefits to the end-user and/or other entities as further contemplated herein. Other examples are also possible.

C. Example Use Cases

Generally speaking, the above-described approaches for device localization may give rise to numerous use cases and applications, which may be beneficial to end-users and/or other entities. Although certain use cases are described herein, other use cases are possible as well.

In one case, the mobile device may use the determined location and/or orientation of the mobile device as basis for one or more operations executed by the mobile device. For example, the mobile device may output a representation of the determined location and/or orientation, perhaps as visual and/or audible output. In a more specific example, the mobile device could display the location and/or orientation in a GUI of a navigation application in line with the examples above. This may be particularly beneficial in the context of pedestrian navigation, such as when a user seeks to obtain a more accurate location and/or orientation of the device when navigating through an urban canyon (e.g., in which GPS positioning may be inaccurate). And in yet other examples, the mobile device could use the determined location and/or orientation for determination of a route (e.g., to be displayed in a navigation application), or the like.

In another case, the mobile device may provide the determined location and/or orientation of the mobile device to another entity. For example, the mobile device could provide a representation of the determined location and/or orientation to a different mobile device, to a server (e.g., a positioning server), and/or to an application program running on the mobile device, among numerous other possibilities. When an entity in turn receives this information, the entity could use it in various ways, such as for positioning, navigation, routing, advertising, city planning, social media, communication, and other applications. In a more specific example, a server associated with a social media application could share the user's accurate location via the social media application (with the user's permission), so as to make this location visible to other users.

In yet another case, the mobile device and/or other entity (e.g., positioning server) could use the determined location and/or orientation of the mobile device respectively as a reference location and/or reference orientation in a position determination process. For instance, such information could be used in a dead reckoning process, in sensor fusion algorithms, in determination of an indoor or outdoor location, and/or in location reference determination etc.

In line with the example described above, consider a situation where navigation is provided from an outdoor location to a specific indoor location. In this situation, the mobile device may determine that the mobile device is in the vicinity of the entrance to the building (e.g., based on an approximate/coarse location of the mobile device being within a threshold distance of the entrance). And responsive to this trigger (and perhaps also responsive to detection of a nearby vehicle), the mobile device could output a notification requesting capture of an image of the vehicle. Alternatively, a user may capture such an image of the vehicle without a request to do so, such as in anticipation of entering the building. In either situation, an accurate outdoor mobile device location can be determined in anticipation of an outdoor-to-indoor transition, to then enable accurate indoor navigation to the specific indoor location e.g., using dead reckoning or the like.

In another specific example, radio-based indoor positioning may involve collection of radio data (e.g., by a positioning server), so as to generate radio map(s) representative of radio characteristics in an environment. This process typically involve collection (e.g., crowdsourcing) of radio fingerprint(s) from device(s), with each such fingerprint respectively including radio data as well a 2D or 3D location reference substantially indicating where this radio data was collected in the environment. However, there are various challenges with respect to determination of an accurate location reference indoors, as GNSS positioning is typically unreliable indoors. Therefore, a given device's indoor location may be more accurately determined using an initial outdoor location reference, sensor data (e.g., from motion sensor(s) and/or barometer(s)), and/or sensor fusion algorithms. As such, one or more of the disclosed approaches could be used to determine a more accurate mobile device location and/or orientation outdoors, which may then be used as or otherwise as basis for determining the initial outdoor location reference, so as to in turn enable determination of a more accurate location track of the mobile device. Here again, a user could be prompted to and/or choose to capture an image of a vehicle in anticipation of an outdoor-to-indoor transition, so as to ensure determination of a more accurate initial outdoor location reference. Numerous other examples and use cases also possible as well.

Furthermore, one or more of the disclosed approaches could be performed in a post-processing manner, such as after all necessary data has been collected and perhaps in a situation where real-time device localization is not required. For instance, more accurate location(s) of a given vehicle may become available over time (e.g., at some point after capture of the vehicle's image), such as a result of applying smoothing estimation(s) (e.g., using location-related data obtained before and after capture of the image). Given this, the more accurate vehicle location(s) could be used in one or more of the disclosed approaches, so as to correspondingly determine a more accurate location of the mobile device. Other aspects are also possible.

D. Example Flowcharts

Figure 4:
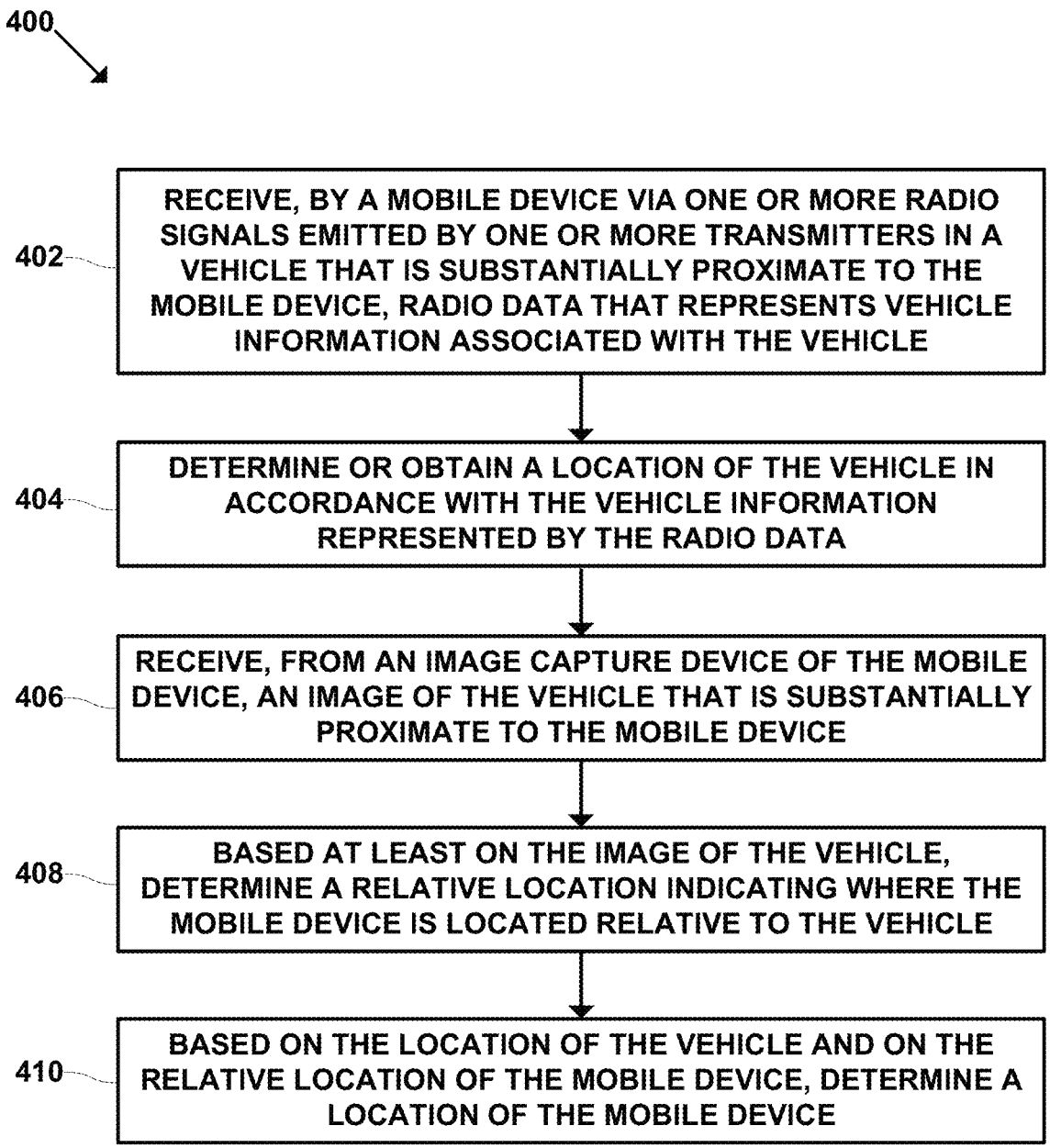
FIG. 4 is an example flowchart related to the radio-visual approach, in accordance with an example implementation.
Figure 5:
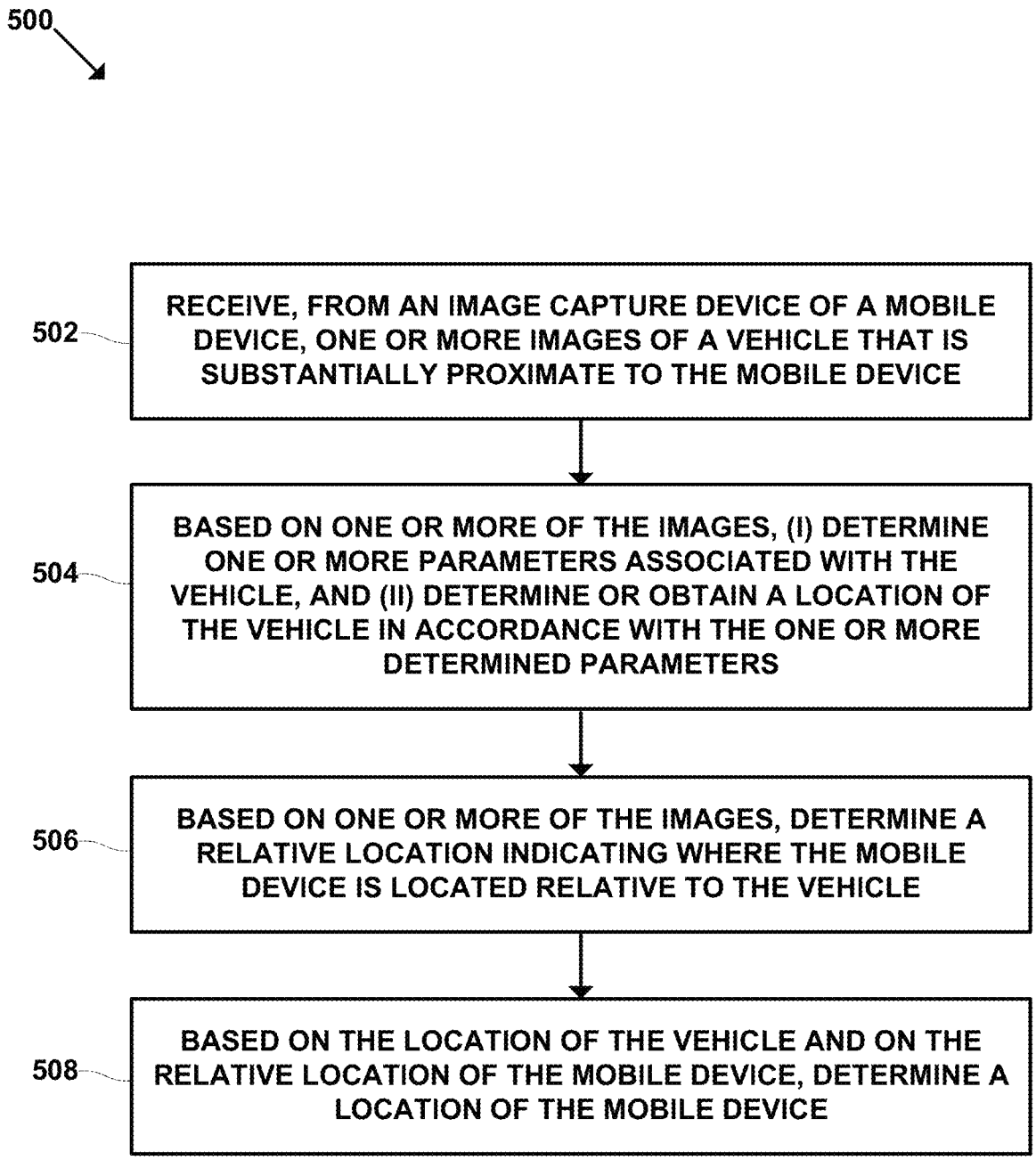
FIG. 5 is an example flowchart related to the image-based approach, in accordance with an example implementation.

FIGS. 4 and 5 are next flowcharts respectively illustrating methods 400 and 500, in accordance with the present disclosure. Methods 400 and 500 could be respectively performed by and/or in an arrangement involving a mobile device, a server device, and/or any other device or system. Also, it should be understood that, if a method is performed by a given entity, the given entity could engage in communication(s) with one or more other entities as necessary to obtain and/or provide any feasible information as understood by one of ordinary skill in the art, to enable the given entity to perform operations described herein and/or to inform another entity about results, among other possibilities. Moreover, in some implementations, the various operations described herein could be distributed among one or more entities, such as in accordance with a client-server arrangement or the like. Other arrangements are also possible.

In an example implementation, methods 400 and/or 500 could be performed by and/or in an arrangement (e.g., arrangement 100) involving a device (e.g., mobile device 102), or more particularly by component(s)/module(s) (e.g., processor(s)) thereof, among other possibilities.

As shown, method 400 involves operations in accordance with blocks 402 to 410. In particular, at block 402, method 400 may involve receiving, by a mobile device via one or more radio signals emitted by one or more transmitters in a vehicle that is substantially proximate to the mobile device, radio data that represents vehicle information associated with the vehicle. Then, at block 404, method 400 may involve determining or obtaining a location of the vehicle in accordance with the vehicle information represented by the radio data. Additionally, at block 406, method 400 may involve receiving, from an image capture device of the mobile device, an image of the vehicle that is substantially proximate to the mobile device. Further, at block 408, method 400 may involve, based at least on the image of the vehicle, determining a relative location indicating where the mobile device is located relative to the vehicle. Finally, at block 410, method 400 may involve, based on the location of the vehicle and on the relative location of the mobile device, determining a location of the mobile device.

Furthermore, as shown, method 500 involves operations in accordance with blocks 502 to 508. In particular, at block 502, method 500 may involve receiving, from an image capture device of a mobile device, one or more images of a vehicle that is substantially proximate to the mobile device. Then, at block 504, method 500 may involve, based on one or more of the images, (i) determining one or more parameters associated with the vehicle, and (ii) determining or obtaining a location of the vehicle in accordance with the one or more determined parameters. And at block 506, method 500 may involve, based on one or more of the images, determining a relative location indicating where the mobile device is located relative to the vehicle. Finally, at block 508, method 500 may involve, based on the location of the vehicle and on the relative location of the mobile device, determining a location of the mobile device.

Although certain methods have been described, it should be understood that other processes and/or modification of one or more of the described processes may also be possible in the context of the present disclosure.

III. Example Hardware and Software

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
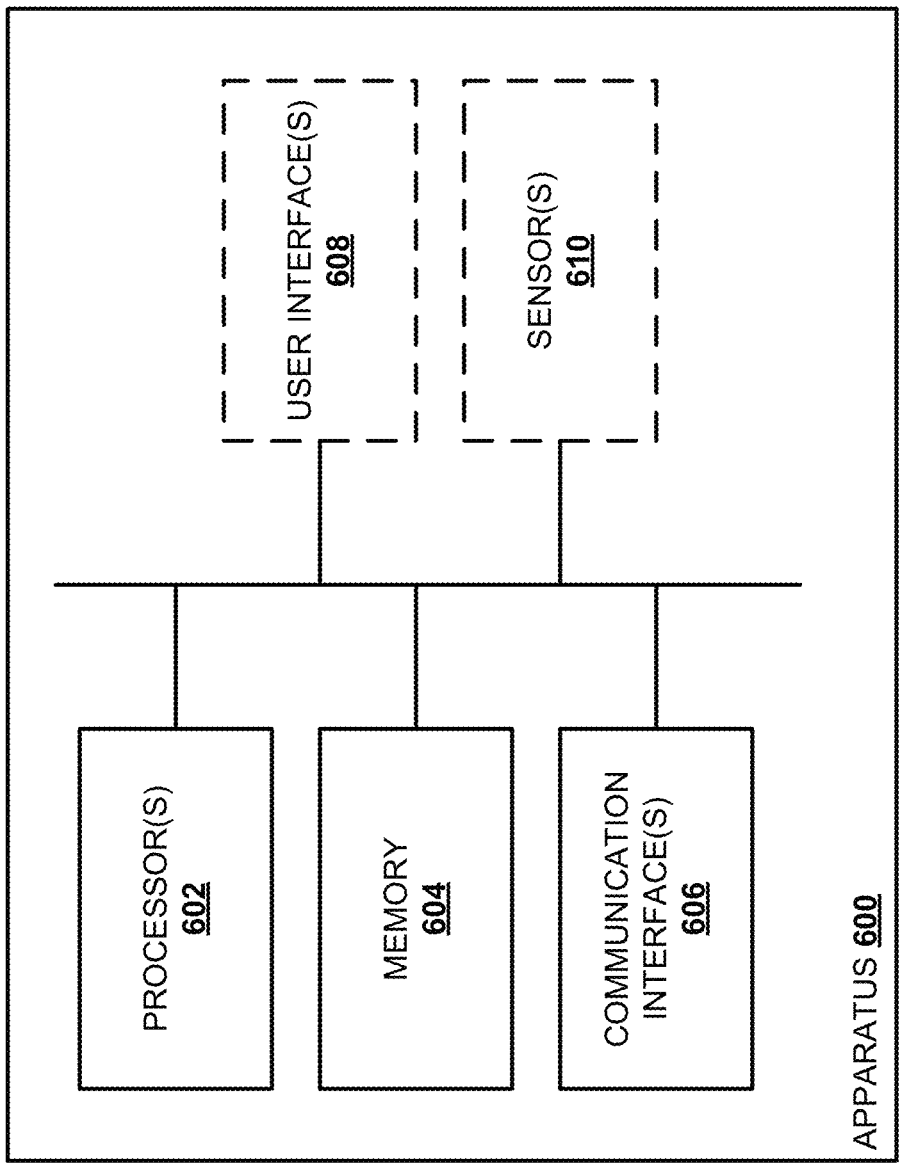
FIG. 6 illustrates an example apparatus, in accordance with an example implementation.

FIG. 6 is a schematic block diagram of an apparatus 600 that may be involved in improved device localization according to an example embodiment. The apparatus 600 could, for instance, represent a server or a mobile device (e.g., mobile device 102), among other options. Moreover, the apparatus 600 could take the form of or otherwise be part of a system, such as any of those described herein.

As shown, apparatus 600 could include processor(s) 602, a memory 604 (e.g., database 108), communication interface(s) 606, an (optional) user interface(s) 608, and (optional) sensor(s) 610. Some or all of the components of the apparatus 600 may be connected via a bus (or other mechanism) and/or be combined into one or more modules.

Processor(s) 602 could have numerous functions, such as controlling the memory 604, communication interface(s) 606, the user interface(s) 608, and/or the sensor(s) 610 in any feasible manner currently known or developed in the future. For example, the memory 604 could include or otherwise contain computer program code (program instructions), and the processor(s) 602 may be configured to execute the program code to cause the apparatus 600 to perform and/or control operations, such as any of those described herein and/or other operations. Thus, apparatus 600 and/or processor(s) 602 could be referred to as carrying out such operations.

Moreover, processor(s) 602 (and also any other processor(s) mentioned herein) may be processor(s) of any suitable type. For example (and without limitation), processor(s) 602 may include: one or more microprocessor(s), one or more processor(s) with accompanying one or more digital signal processor(s), one or more processor(s) without accompanying digital signal processor(s), one or more special-purpose computer chips, one or more FPGA(s), one or more controller(s), one or more ASIC(s), one or more computer(s), any structure/hardware that has been programmed in such a way to perform described operation(s), and/or an application processor that runs an operating system, among other possibilities.

Furthermore, memory 604 could also take various form without departing from the scope of the present disclosure. In particular, memory 604 could be separate from processor(s) 602. Additionally or alternatively, memory 604 may be part of or otherwise integrated with one or more of the processor(s) 602. In this case, memory 604 may be fixed to the from processor(s) 602 or may be at least partially removable from the processor(s) 602. In any case, the memory 604 be or take the form of volatile and/or non-volatile memory, and could include program memory, working memory, and/or data memory, among others.

By way of example (and without limitation), memory 604 could be or otherwise include: FLASH memory (or a part thereof), any of a Read-Only Memory (ROM), PROM, EPROM and EEPROM memory (or a part thereof), a hard disc (or a part thereof), a Random Access Memory (RAM), and/or Dynamic RAM (DRAM), among others. In some cases, memory 604 may additionally or alternatively include an operating system for processor(s) 602 and/or firmware for apparatus 600. Further, memory 604 could additionally or alternatively be used by processor(s) 602 when executing an operating system and/or computer program. Moreover, memory 604 could additionally or alternatively store data, such as any types, sets, instances, and/or samples of data described herein. Other examples are also possible.

Further, communication interface(s) 606 could enable the apparatus 600 to communicate with other entities. The communication interface(s) 606 may, for instance, include a wireless interface (e.g. a cellular radio communication interface and/or a WLAN interface) and/or wire-bound interface (e.g. an IP-based interface, for instance to communicate with entities via the Internet). Moreover, the communication interface(s) 606 may take the form of or provide for wireless and/or wired communication with transmitting and/or receiving device(s), such as one or more antenna(s) and/or radio receiver(s) of the apparatus 600.

Yet further, user interface(s) 608 could be any device(s) for presenting and/or receiving information. For instance, user interface(s) 608 include display device(s), audio device(s) or the like for visually and/or audibly providing information (e.g., to a user). Additionally or alternatively, user interface(s) 608 could include input device(s) (e.g. a keyboard, keypad, touchpad, mouse, etc.) for receiving information (e.g., based on input provided by a user).

Finally, sensor(s) 610 could include any type(s) of sensor(s) currently known and/or developed in the future. For example, sensor(s) 610 could include a barometric sensor (e.g., to gather pressure information), motion sensor(s) (e.g., inertial measurement unit (IMU)), image capture device(s), position sensor(s), Global Navigation Satellite System (GNSS) receiver(s) (e.g., in the form of a Global Positioning System (GPS) receiver), and/or any (currently known and/or future-developed) sensor(s) that enable the apparatus 600 to perform radio measurements (e.g., Bluetooth® and/or Wi-Fi receiver(s)), among other possibilities.

In a further aspect, the term "computer-readable medium" as used herein may refer to any medium that participates in providing information to processor(s), including instructions for execution. Such a medium may take many forms, including, but not limited to computer-readable storage medium (e.g., non-volatile media, volatile media), and/or transmission media. Non-transitory media, such as non-volatile media, may include, for example, optical or magnetic disks, such as storage device. Volatile media may include, for example, a dynamic memory. Transmission media may include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Generally speaking, common forms of computer-readable media may include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read.

In some cases, the term computer-readable storage medium may be used herein to refer to any computer-readable medium except transmission media. Further, logic encoded in one or more tangible media may includes processor instructions on a computer-readable storage media and/or special purpose hardware (e.g., ASIC).

In practice, a computer-readable storage medium could have stored thereon instructions executable by processor(s) to cause an apparatus to perform operations, such as any of those described herein. Accordingly, a computer program could be stored in a computer readable storage medium in the form of instructions encoding the computer readable storage medium. The computer-readable storage medium may be intended for taking part in the operation of a device, like an internal or external memory or hard disk of a computer, or be intended for distribution of the program, like an optical disc, among other options.

IV. Example Geographic Database

Figure 7:
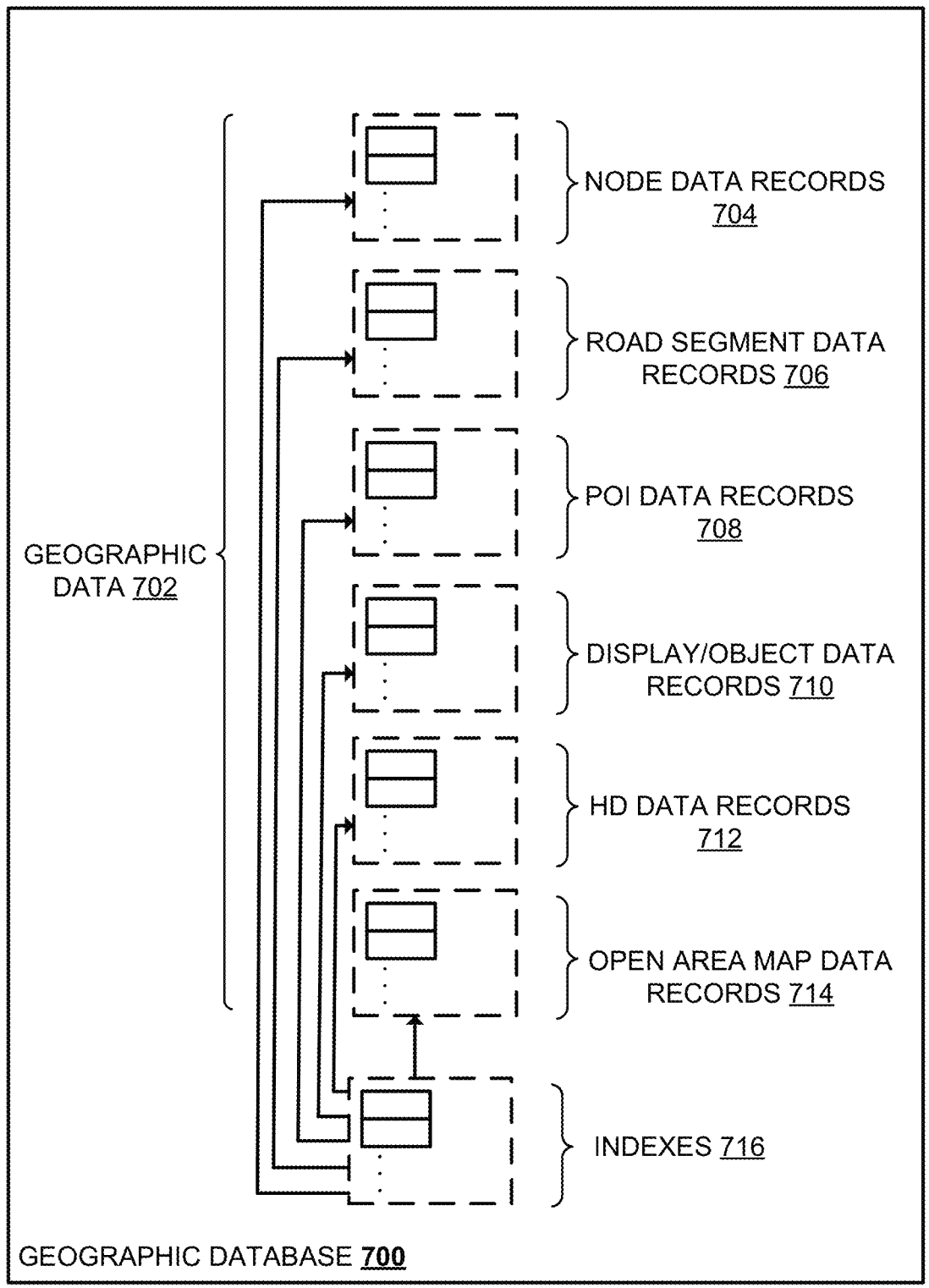
FIG. 7 illustrates a diagram of a geographic database, in accordance with an example implementation.

FIG. 7 illustrates a diagram of a geographic database 700, according to an example implementation. Geographic database 700 could be included within, integrated with, or be separate from another database, data storage device, memory, or the like described herein (e.g., memory 604 and/or database 102). Additionally or alternatively, geographic database 700 could be stored on or otherwise made accessible to any entity described herein without departing from the scope of the present disclosure. Moreover, although certain aspects of the geographic database are described in the context of outdoor mapping and/or outdoor navigation-related services, it should be understand that some or all such aspects could extend to apply in the context of indoor mapping and/or indoor navigation-related services.

In this regard, the terms indoors, indoor area, indoor space, indoor environment, or the like used herein could refer any physical area/space that is at least partially enclosed, such as, e.g., for purpose of at least partially covering people and/or object(s) (e.g., a building, home, venue, tunnel, etc.) And the terms outdoors, outdoor area, outdoor space, outdoor environment, or the like used herein could refer to any physical areas/spaces other than those that are indoors (e.g., a park, street, intersection, sidewalk, beach, plaza, etc.) Of course, the terms indoors and outdoors or the like can be defined in other ways as well.

More specifically, the geographic database 700 may include geographic data 702 used for (or configured to be compiled to be used for) mapping and/or navigation-related services. For instance, the geographic database 700 may include high resolution or high definition (HD) mapping data that provide centimeter-level or better accuracy of map features. By way of example, the geographic database 700 can be based at least in part on Light Detection and Ranging (LiDAR) and/or other technology to collect billions of 3D points and model road surfaces (and/or other map features down), e.g., to the number lanes and their widths. In some cases, the HD mapping data (e.g., HD data records 712) may capture and store details such as the slope and curvature of the road, lane markings, roadside objects such as sign posts, including what the signage denotes, and/or shape/sizes of indoor objects, hallways, rooms etc. In practice, the HD mapping data may enable precise localization of an entity on a road and/or in a building, and/or may enable determination of map data updates (e.g., learned speed limit values) to at high accuracy levels, among other options.

In the geographic database 700, geographic features (e.g., two-dimensional or three-dimensional features) may be represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In this regard, the following terminology may apply to the representation of geographic features in the geographic database 700.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In an example implementation, the geographic database 700 may follow certain conventions. For example, links might not cross themselves and might not cross each other except at a node. Also, there may be no duplicated shape points, nodes, or links. Two links that connect each other may have a common node. In the geographic database 700, overlapping geographic features may be represented by overlapping polygons. When polygons overlap, the boundary of one polygon may cross the boundary of the other polygon. In the geographic database 700, the location at which the boundary of one polygon intersects the boundary of another polygon may be represented by a node. In an embodiment, a node may be used to represent other locations along the boundary of a polygon than a location at which the boundary of the polygon intersects the boundary of another polygon. Additionally or alternatively, a shape point may not be used to represent a point at which the boundary of a polygon intersects the boundary of another polygon.

In an example implementation, the geographic database 700 may be stored as a hierarchical or multi-level tile-based projection or structure. More specifically, in one embodiment, the geographic database 700 may be defined according to a normalized Mercator projection. Other projections may be used. By way of example, the map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest zoom level) may be divisible into four cells or rectangles. Each of those cells are in turn divisible into four cells, and so on until the highest zoom or resolution level of the projection is reached.

In some implementations, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. Further, each cell may be divided into four rectangles and numbered by concatenating the parent tile ID and the new tile position. A variety of numbering schemes also is possible. Any number of levels with increasingly smaller geographic areas may represent the map tile grid. Any level (n) of the map tile grid may have 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In this regard, a system may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In an embodiment, the quadkey is an example of the hash or encoding scheme of the respective geographical coordinates of a geographical data point that can be used to identify a tile in which the geographical data point is located.

As shown, the geographic database 700 may include node data records 704, road segment or link data records 706, Points of Interest (POI) data records 708, display/object data records 710, HD mapping data records 712, open area map data records 714, and indexes 716, for example. More, fewer or different data records can be provided. For example, other data records can include cartographic data records, routing data, and/or maneuver data. Further, the indexes 716 may improve the speed of data retrieval operations in the geographic database 700. For instance, the indexes 716 may be used to quickly locate data without having to search every row in the geographic database 700 every time it is accessed. For example, in one embodiment, the indexes 716 can be a spatial index of the polygon points associated with stored feature polygons.

In exemplary embodiments, the road segment data records 706 may be links or segments representing roads, streets, or paths, as can be used in a calculated or recorded route information for determination of one or more personalized routes. The node data records 704 may be end points corresponding to the respective links or segments of the road segment data records 706. The road link data records 706 and the node data records 704 may represent a road network, such as used by vehicles, cars, and/or other entities. Alternatively, the geographic database 700 can contain path segment(s) and node data records or other data that represent pedestrian paths or areas in addition to or instead of the vehicle road record data (e.g., paths and/or areas for indoor and/or outdoor positioning and/or navigation), for example.

The road/link segments and nodes can be associated with attributes, such as geographic coordinates, street names, address ranges, speed limits, turn restrictions at intersections, and other navigation related attributes, room names/identifiers, vertical connector names/identifiers, as well as POIs, such as gasoline stations, hotels, restaurants, museums, stadiums, offices, automobile dealerships, auto repair shops, buildings, stores, parks, interior building features etc. The geographic database 700 can include data about the POIs and their respective locations in the POI data records 708. The geographic database 700 can also include data about places, such as cities, towns, or other communities, and other geographic features, such as bodies of water, mountain ranges, etc. Such place or feature data can be part of the POI data records 708 or can be associated with POIs or POI data records 708 (such as a data point used for displaying or representing a position of a city). Other examples are also possible.

In some implementations, the geographic database 700 can include display/object data records 710 for storing machine-readable visual representations and map data decoded from the visual representations and their respective properties. In addition, the display/object data records 710 can store post-processing rule sets for correcting and/or reducing the uncertainties in the display/object data decoded from clustered machine-readable visual representations. The display/object data records 700 can also store data selection rules (e.g., in a map data extension layer) for selecting from among multiple sets of readings of a machine-readable visual representation. The display/object data records 700 can also store confidence or accuracy determinations for the decoded map data. By way of example, the display/object data records 700 can be associated with one or more of the node records 704, road segment records 706, and/or POI data records 708 to support uses cases such as enhanced mapping user interaces (UIs), autonomous driving, dynamic map updates, etc. In some cases, the display/object data records 710 may be stored as a data layer of the hierarchical tile-based structure of the geographic database 700 according to the various embodiments described herein.

In some implementations, as discussed above, the HD mapping data records 712 could model map features to centimeter-level or better accuracy. The HD mapping data records 911 may be divided into spatial partitions of varying sizes to provide HD mapping data to vehicles and/or other devices with near real-time speed without overloading the available resources of the vehicles and/or devices (e.g., computational, memory, bandwidth, etc. resources).

In an example implementation, the geographic database 700 can be maintained by a content provider in association with a services platform (e.g., a map developer). The map developer can collect geographic data to generate and/or enhance the geographic database 700. There can be different ways used by the map developer to collect data. These ways can include obtaining data from other sources, such as municipalities or respective geographic authorities. Additionally or alternatively, the map developer can employ field personnel to travel along roads and/or inside buildings (or other indoor areas) throughout the geographic region to observe features and/or record information about them, for example. Additionally or alternatively, remote sensing, such as aerial or satellite photography, can be used.

Generally, the geographic database 700 can be a master geographic database stored in a format that facilitates updating, maintenance, and/or development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data can be compiled (such as into a platform specification format (PSF)) to organize and/or configure the data for performing navigation-related functions and/or services, such as route calculation, route guidance, map display, speed calculation, distance and travel time functions, and other functions, by a navigation or other device. The navigation-related functions can correspond to vehicle navigation, pedestrian navigation, or other types of navigation. The compilation to produce end user databases can be performed by a party or entity separate from the map developer. For instance, a customer of the map developer, such as a navigation device or other end user device developer, can perform compilation on a received geographic database in a delivery format to produce one or more compiled navigation databases.

In a further aspect, as noted, the geographic database 700 could additionally or alternatively include open area map data record(s) 714 for open area map(s). Generally speaking, open area map(s) may include image(s) or the like of respective layout(s) representing pedestrian walkable area(s) (e.g., indoor area(s), such as one or more floors of a building), and may be configured, separately or together, to enable or otherwise provide point-to-point routing within the layout(s). For example, in line with the discussion above, a radio map could include, be combined with, or otherwise correspond to an open area map representing features of an indoor and/or outdoor area at various locations in the area, to enable positioning and/or navigation solution(s) for the area. Other examples are also possible.

In an example implementation, an open area map may be positioned in, on, or over a geographic map or database (e.g., geographic database 700). The geographic map may be or include geographic data (e.g., any feasible data from records 704-712) corresponding to an area other than (or perhaps at least partially overlapping with) the area represented in the open area map. Also, the geographic map may represent compiled data that corresponds to a database or map configured for vehicle and/or pedestrian navigation. Alternatively, the geographic map may correspond to any real-world or geographic map or data that may or may not be used for navigation or routing. In any case, the geographic map may, e.g., include, but is not limited to, a road network. The road network may represent real-world roads or paths, such as in a city or other geographic region. Navigation attributes and POIs may also be provided.

In this regard, the open area map may be associated or linked with the geographic map or data. For example, one or more points or coordinates of the open area map may be aligned or positioned in or with one or more points or coordinates of the geographic map or data. In one embodiment, coordinates corresponding to tiles, objects, or other portion of the open area map may be in, translated to, or converted to real-world coordinates, such as longitude or latitude, Universal Transverse Mercator ("UTM") coordinates, or other rectangular or 3D coordinates, such as altitude or elevation points. Based on the real-world coordinates, the open area map or data thereof may be placed, positioned, or aligned with or within the geographic map.

For example, nodes, segments, or other features of the geographic map may correspond to real-world coordinates, such as longitude, latitude, and/or UTM coordinates as well as elevation or altitude information. Accordingly, by knowing the real-world coordinates of the open area map, the open area map may be accurately linked to a real-world position or location in the geographic map (e.g., geographic database 700 and/or a display). Additionally or alternatively, the coordinates or points of the open area map or data thereof may be linked or associated with a road network, such as road segments, nodes, and/or other features, without reference to real-world coordinates.

Given this, an end user may perform point-to-point routing using the open area map while viewing a surrounding geographic area or map. Also, the open area map may be linked to the geographic map for navigation or routing purposes, such as via point or navigation data.

For example, an end user may want to navigate or route from inside the open area map to a point external to the open area map that is covered in the geographic map, or vice versa (e.g., an indoor-to-outdoor transition and/or an outdoor-to-indoor transition). Accordingly, a route may be calculated and/or displayed in the open area map (e.g., in the context of indoor navigation), and then from a transition point or area, the route or second route (a continuing route to a selected destination outside of the open area map) may be calculated and/or displayed based on route calculation of the geographic map.

In this regard, in some cases, the navigation or routing of the geographic map may be different than the point-to-point routing of the open area map. For example, the routing of the geographic map may be based on vehicle and/or pedestrian navigation attributes of set roadways, and the routing of the open area map may be based on pedestrian navigation attributes of set indoor features (e.g., hallways, lobbies, rooms etc.) But in other cases, the navigation or routing of the geographic map could be the same as or similar to the point-to-point routing of the open area map.

In any case, in other implementations, an open area map may be positioned in or associated with the geographic map without being linked or tied in with navigation or routing features or functions of the geographic map. Namely, the routing or navigation of at least some open area map(s) may be independent or separate from routing or navigation of an associated geographic map. Other examples and aspects are also possible.

V. CONCLUSION

Any connection described herein is to be understood in a way that the involved components are operationally coupled. Thus, the connection(s) can be direct or indirect with any number or combination of intervening elements, and there may be merely a functional relationship between the components.

Moreover, any of the methods, processes and actions described or illustrated herein may be implemented using executable instructions in a general-purpose or special-purpose processor(s) and stored on a computer-readable storage medium (e.g., disk, memory, or the like) to be executed by such processor(s).

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The present disclosure has been described by means of example embodiments. It should be noted that there are alternative ways and variations which are obvious to a skilled person in the art and can be implemented without deviating from the scope of the present disclosure.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method comprising:
receiving, by one or more processors of a mobile device via one or more radio signals emitted by one or more transmitters in a vehicle that is substantially proximate to the mobile device, radio data that represents vehicle information associated with the vehicle;
determining or obtaining, by the one or more processors, a location of the vehicle in accordance with the vehicle information represented by the radio data;
receiving, by the one or more processors from an image capture device of the mobile device, an image of the vehicle that is substantially proximate to the mobile device;
based at least on the image of the vehicle, determining, by the one or more processors, a relative location indicating where the mobile device is located relative to the vehicle; and
based on the location of the vehicle and on the relative location of the mobile device, determining, by the one or more processors, a location of the mobile device.

2. The method of claim 1,
wherein the vehicle information comprises the location of the vehicle, and
wherein determining or obtaining the location of the vehicle is in accordance with the location of the vehicle represented by the radio data.

3. The method of claim 1,
wherein the vehicle information comprises one or more parameters associated with the vehicle, and
wherein determining or obtaining the location of the vehicle is in accordance with the one or more parameters associated with the vehicle.

4. The method of claim 1,
wherein the mobile device has stored thereon or has access to a database containing location information that indicates respective locations of a plurality of vehicles, and
wherein determining or obtaining the location of the vehicle comprises determining or obtaining the location of the vehicle in accordance with the location information in the database and the vehicle information represented by the radio data.

5. The method of claim 4,
wherein the vehicle information comprises one or more parameters associated with the vehicle, and
wherein the location information associates each respective location with one or more respective parameters of a respective vehicle from the plurality of vehicles.

6. The method of claim 4, wherein the vehicle information comprises one or more parameters associated with the vehicle, the method further comprising:
making a determination, by the one or more processors, that the vehicle information represented by the radio data lacks the location of the vehicle, and
in response to making the determination that the vehicle information represented by the radio data lacks the location of the vehicle, determining or obtaining the location of the vehicle in accordance with the location information in the database and the vehicle information represented by the radio data.

7. The method of claim 1, wherein determining the relative location of the mobile device comprises applying a computer vision process to determine the relative location based on the image of the vehicle.

8. The method of claim 1, further comprising:
in response to receiving radio data that represents vehicle information associated with the vehicle, causing, by the one or more processors, an output device of the mobile device to output a notification, wherein the notification requests capture of the image of the vehicle that is substantially proximate to the mobile device.

9. The method of claim 8,
wherein the output device is a display device of the mobile device, and
wherein outputting the notification comprises outputting the notification via a graphical user interface (GUI) displayed by the display device.

10. The method of claim 9, wherein the GUI is of a navigation application.

11. The method of claim 9, wherein the notification comprises one or more of (i) a representation of a field of view of the image capture device of the mobile device, (ii) information about the vehicle, or (iii) a textual description requesting capture of the image of the vehicle that is substantially proximate to the mobile device.

12. The method of claim 1, further comprising:
performing, by the one or more processors, one or more of: (i) causing the mobile device to provide the determined location of the mobile device to an entity or (ii) using the determined location of the mobile device as basis for one or more operations executed by the mobile device.

13. The method of claim 12, wherein the performing comprises using or causing using of the determined location as a reference location in a position determination process.

14. The method of claim 1, further comprising:
determining or obtaining, by the one or more processors, an orientation of the vehicle in accordance with the vehicle information represented by the radio data;
based at least on the image of the vehicle, determining, by the one or more processors, a relative orientation indicating how the mobile device is oriented relative to the vehicle; and
based at least on the orientation of the vehicle and on the relative orientation of the mobile device, determining, by the one or more processors, one or more of an orientation or heading of the mobile device.

15. The method of claim 14, further comprising:
performing, by the one or more processors, one or more of: (i) causing the mobile device to provide the determined orientation of the mobile device to an entity or (ii) using the determined orientation of the mobile device as basis for one or more operations executed by the mobile device.

16. The method of claim 15, wherein the performing comprises using or causing using of the determined orientation as a reference orientation in a position determination process.

17. An apparatus comprising:
one or more processors;
a non-transitory computer readable medium; and
program instructions stored on the non-transitory computer readable medium and executable by the one or more processors to:
receive, via one or more radio signals emitted by one or more transmitters in a vehicle that is substantially proximate to a mobile device, radio data that represents vehicle information associated with the vehicle;
determine or obtain a location of the vehicle in accordance with the vehicle information represented by the radio data;
receive, from an image capture device of the mobile device, an image of the vehicle that is substantially proximate to the mobile device;
based at least on the image of the vehicle, determine a relative location indicating where the mobile device is located relative to the vehicle; and
based on the location of the vehicle and on the relative location of the mobile device, determine a location of the mobile device.

18. The apparatus of claim 17, wherein the apparatus takes a form of or includes the mobile device.

19. The apparatus of claim 17, wherein the program instructions are further executable to perform one or more of: (i) causing the mobile device to provide the determined location of the mobile device to an entity or (ii) using the determined location of the mobile device as basis for one or more operations executed by the mobile device.

20. A non-transitory computer readable medium having stored thereon instructions executable by one or more processors to cause a mobile device to perform operations comprising:
receiving, via one or more radio signals emitted by one or more transmitters in a vehicle that is substantially proximate to the mobile device, radio data that represents vehicle information associated with the vehicle;

determining or obtaining a location of the vehicle in accordance with the vehicle information represented by the radio data;

receiving, from an image capture device of the mobile device, an image of the vehicle that is substantially proximate to the mobile device;

based at least on the image of the vehicle, determining a relative location indicating where the mobile device is located relative to the vehicle; and based on the location of the vehicle and on the relative location of the mobile device, determining a location of the mobile device.

\* \* \* \* \*